United States Patent [19]

Ables et al.

[11] Patent Number: 5,196,070
[45] Date of Patent: Mar. 23, 1993

[54] THERMALLY STABLE WATER SOLUBLE SOLDER FLUX AND PASTE

[75] Inventors: Wallace H. Ables, Apalachin, N.Y.; Dwight R. Howle, Cedar Park; John S. Humphrey; Robert G. Raines, both of Austin; Richard A. Reich, Georgetown, all of Tex.; Robert A. Sorensen, Poway, Calif.; Robert Valdez, Round Rock; Abdoul R. Zamani, Austin, both of Tex.

[73] Assignee: International Business Machines Corporation, Armonk, N.Y.

[21] Appl. No.: 815,669

[22] Filed: Dec. 31, 1991

[51] Int. Cl.$^5$ ............................................. B23K 35/34
[52] U.S. Cl. ...................................... 148/23; 148/24; 148/25
[58] Field of Search .................................... 148/23-25

[56] References Cited

U.S. PATENT DOCUMENTS

| | | | |
|---|---|---|---|
| 3,065,538 | 11/1962 | Melchiors | 148/25 |
| 4,140,554 | 2/1979 | Stayner | 148/23 |
| 4,428,780 | 1/1984 | Shedroff | 148/23 |
| 4,478,650 | 10/1984 | Zado | 148/23 |

*Primary Examiner*—Peter D. Rosenberg
*Attorney, Agent, or Firm*—Duke W. Yee; Andrew J. Dillon

[57] ABSTRACT

A water soluble, thermally stable, solder flux for use in forming a water soluble, thermally stable, solder paste is provided. The water soluble, thermally stable, solder flux contains an acidic ester component having about 50% to about 60% monoesters by weight based on total weight, about 40% to about 50% diesters by weight based on total weight, and about 0% to about 1.5% phosphoric acid by weight based on total weight. This ester component is combined with triethanolamine to form a flux vehicle having a molar ratio of triethanolamine to the ester component of about 0.6 to about 1.2. This vehicle is present in the solder flux in an amount from about 68% to about 79% by weight based on total weight of solder flux. The flux also contains rheology adjusting components in an amount ranging from about 17% to about 26% by weight based on total weight of solder flux. Citric acid included in the flux in an amount ranging from about 4% to about 6% by weight based on total weight of solder flux.

20 Claims, No Drawings

THERMALLY STABLE WATER SOLUBLE SOLDER FLUX AND PASTE

BACKGROUND OF THE INVENTION

1. Technical Field

The present invention relates generally to an improved solder flux and paste useful in microelectronic applications and in particular, to an improved water soluble solder flux and paste. Still more particularly, the present invention provides an improved water soluble solder flux and paste that is thermally stable.

2. Description of the Related Art

In producing printed circuit boards, both primary attachment and the rework/repair of components for these printed circuit boards have been accomplished utilizing rosin-based solder pastes and rework/repair fluxes. These organic, rosin systems require non-aqueous solvents, such as chlorofluorocarbon ("CFC") solvents, for proper cleaning after the attachment or rework/repair of components.

Solder paste contains a flux as a component. Solder powder is suspended in the flux. This flux component of the solder paste is the material that controls many of the requirements of the solder paste. For example, the flux must remove metal oxides from the solder powder and other metallurgy present to allow reflow of all the solder properly.

In a typical manufacturing operation, solder paste is screened onto a circuit board, using an appropriately patterned stencil, in all of the locations requiring connection of components to copper pads. Next, components are placed on the circuit board on the prepared sites. The solder paste must be tacky enough to hold the components in their required location until the board is subject to reflow, at which time the solder paste flows to become the soldered connection for the components. Reflow is the term used to describe heating the solder above its melting temperature to give a soldered joint.

The rosin based solder pastes currently utilized in the industry have the major part of the flux system composed on a complex mixture derived from a natural product based on pine-tar residue (called rosin), which results when volatile fractions are distilled from the pine-tar. As mentioned above, such rosin-based flux systems require an organic solvent to clean the flux residue after reflow. Although the best solvent for cleaning such fluxes is a halogenated hydrocarbon, the current desire to decrease the use of halogenated hydrocarbons, makes the use of this type of flux less desirable. Recently, in a global effort to curtail CFC emissions, water-soluble solder pastes and water-soluble rework/repair fluxes have been introduced which may be cleaned sufficiently with aqueous cleaners to produce a residue-free solder joint.

The presently available water soluble solder fluxes and pastes are sensitive to thermal changes and certain levels of thermal energy. Thus, the presently available water soluble solder fluxes and pastes are sensitive to the various conditions encountered during storage and transportation of the water soluble fluxes and pastes. In particular, the thermal stability of the water soluble solder paste, produced with solder powder and a water soluble flux, is a very common shortcoming of the presently available water soluble pastes. For example, some water soluble solder pastes, i.e., WSP 1206 or 1208 from Alpha Metals, Incorporated, must be stored at very cold temperatures in order to prevent various components of the water soluble solder paste from separating and/or undergoing an undesirable chemical change. The Alpha Metals product, WSP 1206 or 1208, has a marked decrease in performance if the product is not kept continuously frozen until utilized. In other cases, the water soluble solder paste is sensitive to temperature changes encountered during shipping. If a water soluble solder paste, normally, stored at ambient temperatures encounters low temperatures, i.e., zero degrees centigrade, some of the components may precipitate or drop out of the mixture to form crystals, making the paste unusable. Expensive measures are thus necessary to maintain the integrity and ensure the quality of the presently available water soluble solder fluxes and pastes.

Therefore, it would be desirable to have a water soluble solder flux and paste that is stable at various conditions encountered prior to use including a wide range of temperatures.

It would also be desirable to provide such a water soluble flux and paste which has the desired physical and performance characteristics required for microelectronic applications but without the attendant disadvantages of rosin-based systems.

It would also be desirable to provide such a flux and paste which is economical to manufacture and which can be formulated from commercially available components.

SUMMARY OF THE INVENTION

The foregoing objects are accomplished by the improved water soluble solder flux and paste of the invention. A water soluble, thermally stable, solder flux for use in forming a water soluble, thermally stable, solder paste is provided. The water soluble, thermally stable, solder flux contains an acidic ester component that includes from about 50% to about 60% monoesters by weight based on total weight of ester component, about 40% to about 50% diesters by weight based on total weight of ester component, and about 0% to about 1.5% phosphoric acid by weight based on total weight of ester component. This acidic ester component is combined with triethanolamine in a preferred molar ratio of the triethanolamine to the ester component of about 0.6 to about 1.2. The acidic ester component-triethanolamine mixture react and form a flux vehicle present in the flux in an amount from about 68% to about 79% by weight based on total weight of solder flux. The flux also contains rheology adjusting components in an amount ranging from about 17% to about 26% by weight based on total weight of flux. Citric acid is used as an activator and thickener and is included in the flux in an amount ranging from about 4% to about 6% by weight based on total weight of the flux.

The water soluble, thermally stable, solder flux which results can be used to provide a solder paste suitable for a variety of microelectronic applications and does not require the use of non-aqueous solvents.

Additional objects, features and advantages will be apparent in the written description which follows.

DETAILED DESCRIPTION OF PREFERRED EMBODIMENT

The novel features believed characteristic of the invention are set forth in the appended claims. The invention itself however, as well as a preferred mode of use, further objects and advantages thereof, will best be understood by reference to the following detailed description of an illustrative embodiment.

The foregoing objects are accomplished by the improved water soluble solder flux and paste of the invention. The water soluble, thermally stable, solder flux contains an acidic ester component that includes from about 50% to about 60% monoesters by weight based on total weight of ester component, about 40% to about 50% diesters by weight based on total weight of ester component, and about 0% to about 1.5% phosphoric acid by weight based on total weight of ester component. This acidic ester component is combined with triethanolamine in a preferred molar ratio of the triethanolamine to the ester component of about 0.6 to 1.2. The acidic ester component-triethanolamine mixture react and form a flux vehicle present in the flux in an amount from about 68% to about 79% by weight based on total weight of solder flux. The flux also contains rheology adjusting components in an amount ranging from about 17% to about 26% by weight based on total weight of flux. Citric acid is used as an activator and thickener and is included in the flux in an amount ranging from about 4% to about 6% by weight based on total weight of the flux.

A preferred water soluble, thermally stable flux vehicle may be produced from GAFAC RE610 ("GAFAC"), a trademark of GAF Corporation for nonylphenyl polyoxyethylene ether phosphate (whose chemical formula is shown in Table I), containing diesters ($H_{127}PO_{24}C_{70}$), monoesters ($H_{65}PO_{14}C_{35}$), and phosphoric acid ($H_3PO_4$); triethanolamine ("TEA"); diethylene glycol ether ("DGDE"); propylene carbonate ("PC"), dipropylene glycol ("DPG"); ad citric acid ("CA").

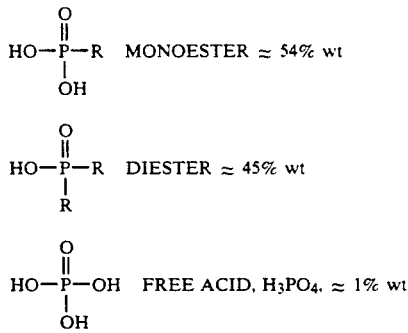

where

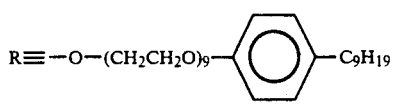

DGDE, PC, and DPG are utilized as rheology adjusters with DGDE as the thickener and PC and DPG as the thinners. Next, although GAFAC is a preferred reagent in accordance with a preferred embodiment of the present invention, any reagent containing acidic esters with similar chemical moiety, capable of a proton transfer, can be utilized. The polar group may be carboxylic acid, a sulfonic acid, a phosphoric acid, a sulfate monoester, a phosphate monoester, a phosphate diester, a phosphate triester or mixtures thereof. The above described polar group may be attached to a moiety selected from the group consisting of an alkoxy group, an aryloxy group, an alkaryloxy group, a poly (alkyleneoxide) group or adducts thereof or any combination thereof.

The above described polar group may be attached to a moiety of the structure:

$R—O—$ where R is a straight or branched chain alkyl group having 1 to 12 carbon atoms, preferably 8 carbons.

The above-described polar group may be attached to a moiety of the structure:

$R—C_6H_4—(OCH_2CH_2)_n—O—$ where R is a straight of branch chain alkyl group having 1–12 carbon atoms and n=4–15. The most preferred structure is where R is a straight or branch chain alkyl group containing 9 carbon atoms and n=8–11.

The organic fluxes with a polar group include the following commercially available products: GAFAC RE-610 GAFAC RE-410, (available from GAF Corporation under tradenames GAFAC RE-610 and GAFAC RE-410) WAYFOS D-10-N, and WAYFOS M-100 (available from Olin Corporation under tradenames WAYFOS D-10-N and WAYFOS M-100). The most preferred is GAFAC RE-610. The range of usable diesters and monoesters for the GAFAC RE-610 are as follows:

| | |
|---|---|
| monoester | 50%–60% of the total weight of ester component |
| diester | 40%–50% of the total weight of ester component |

The phosphoric acid constituent found in the GAFAC vehicle is an optional component and is present in very small percentages, if present at all. The range of phosphoric acid should be from about 0% to 1.5% of the total weight of ester component. The phosphoric acid should be low because it imparts additional acidity to the product, without beneficial rheological properties.

The following is an example of the procedure for determining the amount of reagents to utilize in preparing a water soluble, thermally stable, solder flux and paste in accordance with a preferred embodiment of the present invention:

EXAMPLE

A. The the relative distribution of the phosphorous was determined by phosphorous nuclear magnetic resonance ("P-NMR"). This yielded data regarding the percentages of each constituent in a sample of GAFAC in terms or weight (normalized to 100% of the reactive ionizable hydrogen):

| | |
|---|---|
| $H_3PO_4$ | 1.05% |
| monoester | 55.01% |
| diester | 43.94% |

B. The next step is to take into account the unreactive "non-ionics", measured as 4.0% by weight based on total weight. The mass of the GAFAC needed is equal to the moles of GAFAC needed times the averaged molecular weight divided by the mass fraction of ionizable GAFAC. Since the percentage of "non-ionics is 4%, the reactive mass fraction is 0.96. Consequently, an extra 4% by weight of GAFAC was needed following the molar requirement indicated.

C. Next, the averaged molecular weight is calculated as follows:

P = phosphoric contribution = 97.97 g/g-mole × 1.05 wt %

M = monoester contribution = 740.32 g/g-mole × 55.01 wt %

D = diester contribution = 1382.67 g/g-mole × 43.94 wt % averaged molecular weight = P + M + D = 1,015.82 g/g-mole

D. The equivalents of the reactive hydrogen ion, for proton transfer, was determined to be:

1 mole of phosphoric acid required 3 moles of TEA for 100% stoichiometric neutralization
1 mole of monoester requires 2 moles of TEA
1 mole of diester requires 1 mole of TEA TEA has a molecular weight of 149.19 and accepts one proton ($H^+$) for theoretical neutralization—not necessarily equivalent to pH = 7.0

The formula composition for 0.85 molar equivalent of TEA to GAFAC was determined as outlined below.

Given 1000 g of GAFAC, 960 g of reactive constituents and 40 g of "non-ionic" constituents were present. With 960 g of GAFAC:

P = 10.08 g = 0.1029 g/moles
M = 528.096 g = 0.7133 g-moles
D = 421.824 g = 0.3051 g-moles The mass requirement of TEA of a 0.85 molar ratio was determined to be:

for P, TEA = (3 eq $H^+$)(0.85)(0.1029M) = 0.2624M
for M, TEA = (2 eq $H^+$)(0.85)(0.7133M) = 1.2126M
for D, TEA = (1 eq $H^+$)(0.85(0.3051M) = 0.2593M Thus, 1.7343 moles of TEA were needed. This value translated into approximately 258.74 g. In other words 258.74 g of TEA was required for every 1000 g of GAFAC.

Utilizing this result, the required amount of TEA needed for various amounts of diesters, monoesters and phosphoric acid can be determined.

The optimal values for the water soluble, thermally stable, solder flux and paste under a preferred embodiment of the present invention are follows:

| | FLUX | | |
|---|---|---|---|
| Component | Formula | Formula Weight | Flux Formula (wt %) |
| GAFAC RE-160 | 150.0 g | 150.0 g | 58.56 |
| TEA | 36.0 ml | 38.81 g | 15.15 |
| DGDE | 23.1 ml | 20.44 g | 7.98 |
| PC | 4.32 ml | 5.14 g | 2.01 |
| DPG | 28.8 ml | 29.46 g | 11.50 |
| CA | 12.3 g | 12.30 g | 4.80 |
| Total | | 256.15 g | 100.00 |

The FLUX COMPONENT is combined with solder powder to form a PASTE as follows:

| | PASTE | |
|---|---|---|
| Component | Formula weight | Formula (weight %) |
| Flux | 256.15 g | 8.00 |
| Solder Powder | 2945.73 g | 92.00 |
| TOTAL | 3201.88 g | 100.00 |

The optimal formula may be varied somewhat and still retain the desirable property of stability in storage.

As mentioned before, the amount of monoesters may vary from about 50% to about 60%, while the diester may vary from about 40% to 50%. The phosphoric acid may vary from about 0% to about 1.5% by weight. The molar ratio of TEA/GAFAC should be from about 0.6 to about 1.2. DGDE, PC, DPG, and CA may be varied approximately ±20% from the optimal formula weight.

In other words, DGDE may vary from about 6% to about 10% by weight based on total weight and PC from about 1.69% to about 2.4% by weight based on total weight. DPG may be varied from about 9% to about 14% by weight based on total weight, and CA could be varied from about 4% to about 6% by weight based on total weight.

The soldering activity of the paste under a preferred embodiment of the preferred invention may be adjusted by the CA level in the flux. The CA may vary ±20% from the optimal values. More than 20% below the optimal value results in a paste that is not aggressive enough and more than about 20% above the optimal value results in the water cleanability and viscosity suffering.

In addition, the metal or solder powder loading may be altered to change the amount of solder on a joint without utilizing new stencils. A particular stencil has a particular size opening, which results in a constant volume of solder paste being deposited on the joint. A higher metal loading means more solder can be placed in a fixed volume, and vice versa. Thus, the dimensions of an optimal stencil need not be changed, resulting in less defects and reworking.

In preparing the water soluble solder flux and paste under a preferred embodiment of the present invention, TEA is added to GAFAC under a controlled addition rate at an elevated temperature such that both energetic and diffusion barriers to the GAFAC/TEA reactants are overcome. Generally, an isothermal reaction condition of about 50° C. to 70° C. and the addition of the TEA reactant at about 0.5 ml/min for each 100 grams of GAFAC is sufficient to overcome the energetic and diffusion barriers of the two reactants. The scale-up of large production batches could be accomplished using these parameters as starting points, however appropriate engineering principles must be applied to mixing, heat transfer, and addition rates.

After combining GAFAC and TEA, DGDE is added to the mixture. PC is added after DGDE; DPG is added after PC. The mixture is cooled under ambient conditions for at least one hour. After at least one hour, CA is added to the mixture. The CA is added in the form of particles or crystals with a particle size of −120 to +200 mesh. Particles that are smaller may be prematurely consumed by the flux; particles that are larger will add excessively to the aging process and the graininess (fineness of grind) of the flux vehicle. Particles of the size −120 to +200 mesh size allow for some crystals to remain in the flux vehicle.

The aging process lasts for at least 5 days in order to allow for the dissolution of the CA. During the aging process, the CA particles and the TEA react to form a stable thixotropic gel. The final product may be stored at room temperature.

The following is a more detailed explanation of a preferred procedure for producing a flux and a solder paste according to the teachings of the present invention and illustrating the best known mode for practicing the invention:

FLUX AND PASTE MIXING PROCEDURES

The following chemicals are used in the production of water soluble solder flux and paste. This is a laboratory procedure which will yield about 250 grams of flux vehicle, which will produce about 3 kg of solder paste.

| | |
|---|---|
| GAFAC RE 610 | [GAFAC] |
| TRIETHANOLAMINE | [TEA] |
| DIETHYLENE GLYCOL DIBUTYL ETHER | [DGDE] |
| PROPYLENE CARBONATE | [PC] |
| DIPROPYLENE GLYCOL | [DPG] |
| CITRIC ACID | [CA] |
| SOLDER POWDER | [SN/PB] |

1. Mixing the chemical components for the flux is the first step in paste production. When chemicals are weighed, use the differential weight (weigh and tare) method of measuring, using the 0–2000 gram capacity scale, otherwise use the dropwise addition method with either 10 ml or 100 ml burettes.

2. Fill the water bath with warm water, and set temperature control so that the water temperature stabilizes at 60 deg. C. in a 1000 ml beaker, weigh out 150.0 grams of GAFAC. Place the beaker in the clamp, and lower the beaker into the water bath. Set up the overhead mixer so that the dispersion blade is completely covered by the GAFAC. This reduces air entrainment. Set up the thermometer so that it is flush with the inside of the beaker. Start the mixer at a slow speed.

3. Fill 3, 100 ml burettes, with the appropriate chemicals. One for TEA, one for DGDE, and one for DPG. Fill a 10 ml burette with PC. Seal the open ends and store in holding rack. Place the TEA burette in the clamp behind the water bath so that the neck of the burette is along the side of the beaker. When the GAFAC reaches 60+/−1 deg. C., open the TEA valve completely. Monitor the GAFAC/TEA mixture so that the maximum exotherm temperature can be observed. When 36.0 ml of TEA has been added, close the valve. This requires about 30 minutes for the transfer. Allow the mixture to mix an additional 15 minutes.

4. Place the DGDE burette in the clamp and adjust the neck as above. Open the valve so that the DGDE drips at the rate of about 2 drops per second. Record the start time of the add. When 23.1 ml has been added, close the valve. Record the time. Allow the mixture to mix for an additional 5 minutes.

5. Place the 10 ml PC burette in the clamp and adjust the neck as before. Adjust the valve so that it drips at a rate of about 2 drops per second. When 4.32 ml of PC has been added, close the valve. Allow the mixture to mix for an additional 5 minutes.

6. Place the DPG burette in the clamp and adjust the neck as before. Begin the DPG add. When 28.8 ml of DPG has been added, close the valve. Allow the mixture to mix for an additional 5 minutes.

7. Remove the completed flux mixture form the water bath. Pour the mixture into a 500 ml plastic jar, purge with nitrogen, and seal. Allow this mixture to cool for 1.5 hrs.

8. After the flux mixture has cooled, the Citric Acid can be added. Place the jar on the scale and tare. Add 12.3 grams of (−120 to +200 mesh) powder. Stir the CA into the flux by hand using a small spatula. When the CA has been completely stirred into the flux, a baseline rheogram should be run, using the Ferranti-Shirley cone and plate viscometer. It should be run at the 120 second sweep time and on a scale of 1. Make sure the viscometer has been calibrated for the day, prior to running the rheogram. Also do a grind gauge (fineness of grind) measurement at this time.

9. The completed flux now needs to age. The normal aging process is 6 days. During this process, the flux has to be stirred every day. Using a plastic spatula, scrape the bottom and sides of the jar so that all of the CA that may be stuck to the jar is remixed into the solution. After stirring for 2 minutes, run a rheogram and fineness of grind. The viscometer needs to be run using the same settings as above. The flux should be stirred every 24 hours. It usually takes 4 days for the flux to reach a stable semi-solid state.

10. After the flux has aged for 6 days, solder paste can be made. At this time, run a rheogram and fineness of grind on the flux. This formula will produce 3.0 kg of solder paste. In the mixing pot, weigh out 240.00 grams of flux. In the powder dispensing container, weigh out 2760.00 grams of solder powder. Record all the weights on the paste data sheet. The size of the powder to be used is −325 to +500 mesh. Gently mix each bag of powder before opening the bag, by turning the bag end over end.

11. Place the mixing pot in the planetary mixer. Remove the cover on the port on the front of the mixer. Start the mixer with the speed setting at 12% of full power. Using the scale in the fume hood as a guide, make 6 equal adds of solder powder. There should be 5 minutes between each add. When all of the powder has been added, close the port and begin the flow of nitrogen.

12. When the paste has mixed for 20 minutes from the last powder add, stop the mixer and run a rheogram of the paste. Rheograms should be run at 120 second sweep time and on a scale of 4. At this point, the pot should be removed. Scrape the sides and bottom of the pot so that there are no pockets of powder or flux. If powder adjustments are required, do so at this time. Restart the mixer and allow to mix for another 15 minutes.

13. Remove the mixing pot from the mixer. Place all of the paste in a 500 to 1000 ml plastic jar. A time zero rheogram will need to be run at this time. Run the rheogram at 120 seconds and on a scale of 4. Place the paste in the nitrogen purge glove box and allow to purge for 10 minutes. After the paste has purged, seal the lid and allow to age. The aging process will take 12 days. On the 3rd day and the 6th day, the paste will need to be stirred. Stirring should be for 2 minutes using a slow hand mixing to avoid entrainment of air. After the 6th day the paste is to be left alone until time for testing. Run rheograms after each stirring, at the same settings as before. The paste is ready for sue after the 12th day.

In accordance with a preferred embodiment of the present invention, the water soluble solder flux and paste produced as a distinct advantage of stability in storage conditions. Consequently, the need to store a water soluble solder paste in a frozen form or at refrigerated temperatures is avoided, making the water soluble solder flux and paste of the present invention more economical to utilize and store.

Tests were conducted on water soluble pastes under a preferred embodiment of the present invention for storage period of up to 3 months. The results were that no significant deterioration in paste performance occurred. Furthermore, testing at room temperature on pastes up to 6 months old showed some signs of deterioration, the pastes still yielded acceptable performance.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claim will cover any such modifications or embodiments that fall within the true scope of the invention.

What is claimed is:

1. A water soluble, thermally stable, solder flux containing four major chemical groups, the water soluble, thermally stable, solder flux consisting essentially of:
    an organic moiety with a polar group;
    a non-halogenated amine combined with the organic moiety in a ratio non-halogenated amine to organic moiety with a polar group of about 0.6:1 to 1.2:1, to form a flux vehicle;
    from about 17 percent to about 26 percent, of a mixed-polarity solvent system for rheological modification; and
    from about 4 percent to about 6 percent by weight based on total weight of solder flux, of an acidic organic compound to serve as an activator.

2. A water soluble, thermally stable, solder flux comprising:
    an acidic ester component combined with a non-halogenated amine to form a flux vehicle, the molar ratio of the non-halogenated amine to the ester component being from about 0.6:1 to about 1.2:1, said flux vehicle being present in a range from about 68 percent to about 79 percent by weight based on total weight of solder flux;
    from about 6 percent to about 10 percent by weight based on the total weight of solder flux, of a diethylene glycol dibutyl ether;
    from about 1.6 percent to about 2.4 percent by weigh based on total weight of solder flux, of a propylene carbonate;
    from about 9 percent to about 14 percent by weight based on total weight of solder flux, of a dipropylene glycol; and
    from about 4 percent to about 6 percent by weight based on total weight of solder flux, of an acidic organic compound to serve as an activator.

3. The water soluble, thermally stable, solder flux of claim 1, wherein the non-halogenated amine is triethanolamine.

4. The water soluble, thermally stable, solder flux of claim 1, wherein the acidic ester component includes about 50 percent to about 60 percent monoesters by weight based on total weight of the ester component, about 40 percent to about 50 percent diesters by weight based on total weight of the ester component, and about 0 percent to about 1.5 percent phosphoric acid by weight based on total weight of the ester component.

5. The water soluble, thermally stable, solder flux of claim 4, wherein the ester component is GAFAC RE-610.

6. The water soluble, thermally stable solder flux of claim 1, wherein the acidic organic compound is citric acid.

7. A water soluble, thermally stable, solder paste comprising:

from about 85 percent to 93 percent by weight based on total weight of the solder paste, of a solder powder and from about 7 percent to about 15 percent by weight based on total weight of the solder paste, of a flux vehicle including an acidic ester component combined with triethanolamine to form a flux vehicle having a ratio of the acidic ester component to the triethanolamine of about 0.6:1 to about 1.2:1, the acidic ester component being present in a range from about 68 percent to about 79 percent by weight based on total weight of solder flux; from about 6 percent to about 10 percent by weight based on total weight of solder flux, of a diethylene glycol dibutyl ether; from about 1.6 percent to about 2.4 percent by weight based on total weight of solder flux, of a propylene carbonate; from about 9 percent to about 14 percent by weight based on total weight of solder flux, of a dipropylene glycol; and from about 4 percent to about 6 percent by weight based on total weight of solder flux, of an acidic organic compound.

8. The water soluble, thermally stable, solder paste of claim 7, wherein the solder powder is a tin/lead alloy.

9. The water soluble, thermally stable, solder paste of claim 7, wherein the acidic ester component includes about 50 percent to about 60 percent monoesters by weight based on total weight of ester component, about 40 percent to about 50 percent diesters by weight based on total weight of ester component, and about 0 percent to about 1.5 percent phosphoric acid by weight based on total weight of solder flux.

10. The water soluble, thermally stable, solder paste of claim 7, wherein the acidic organic compound is a carboxylic acid.

11. The water soluble, thermally stable, solder paste of claim 7, wherein the acidic organic compound is a citric acid.

12. A method for producing a water soluble, thermally stable, solder flux comprising:
    first combining an acidic ester component with triethanolamine to form a flux vehicle with a molar ratio of triethanolamine to the ester component of about 0.6:1 to about 1.2:1, the flux component being present in a range from about 68 percent to about 79 percent by weight based on total weight of solder flux;
    adding from about 1.6 percent to about 2.4 percent by weight based on the total weight of solder flux, of a diethylene glycol dibutyl ether to the flux vehicle;
    adding from about 1.90 percent to about 2.29 percent by weight based on total weight of solder flux, of a propylene carbonate to the flux vehicle after adding the diethylene glycol dibutyl ether;
    adding from about 9 percent to about 14 percent by weight based on total weight of solder flux, of a dipropylene glycol to the flux vehicle after adding the propylene carbonate; and
    adding from about 4% to about 6% by weight based on total weight of solder flux, of citric acid to the flux vehicle after adding the dipropylene glycol.

13. The method of claim 12, wherein the acidic ester component includes about 50 percent to about 60 percent monoesters by weight based on total weight of the ester component, about 40 percent to about 50 percent diesters be weight based on total weight of the ester component, and about 0 percent to about 1.5 percent phosphoric acid by weight based on total weight of the acidic ester component.

14. The method of claim 12, wherein the acidic organic compound is a carboxylic acid.

15. The method of claim 12, wherein the citric acid is added to the flux vehicle in a crystal particle form having a mesh size of about −120 to +200.

16. The method of claim 12, wherein the flux vehicle is aged for at least five days, with periodic mixing.

17. The water soluble, thermally stable, solder flux of claim 1, wherein the polar group is attached to a moiety of the structure:

$$R\text{---}O\text{---}$$

where R is a straight or branched chain alkyl group having 1 to 12 carbon atoms.

18. The water soluble, thermally stable, solder flux of claim 1, wherein the polar group is attached to a moiety of the structure:

$$R\text{---}O\text{---}$$

where R is a straight or branched chain alkyl group having eight carbon atoms.

19. The water soluble, thermally stable, solder flux of claim 1, wherein the polar group is attached to a moiety of the structure:

$$R\text{---}C_6H_4\text{---}(OCH_2CH_2)_n\text{---}O\text{---}$$

where R is a straight or branch chain alkyl group having 1 to 12 carbon atoms and n=4-15.

20. The water soluble, thermally stable, solder flux of claim 1, wherein the polar group is attached to a moiety of the structure:

$$R\text{---}C_6H_4\text{---}(OCH_2CH_2)_n\text{---}O\text{---}$$

where R is a straight or branch chain alkyl group having nine carbon atoms and n=8-11.

* * * * *